April 18, 1939.    R. H. ANDEREGG ET AL    2,155,371
HEATING SYSTEM
Filed Sept. 11, 1937    4 Sheets-Sheet 1
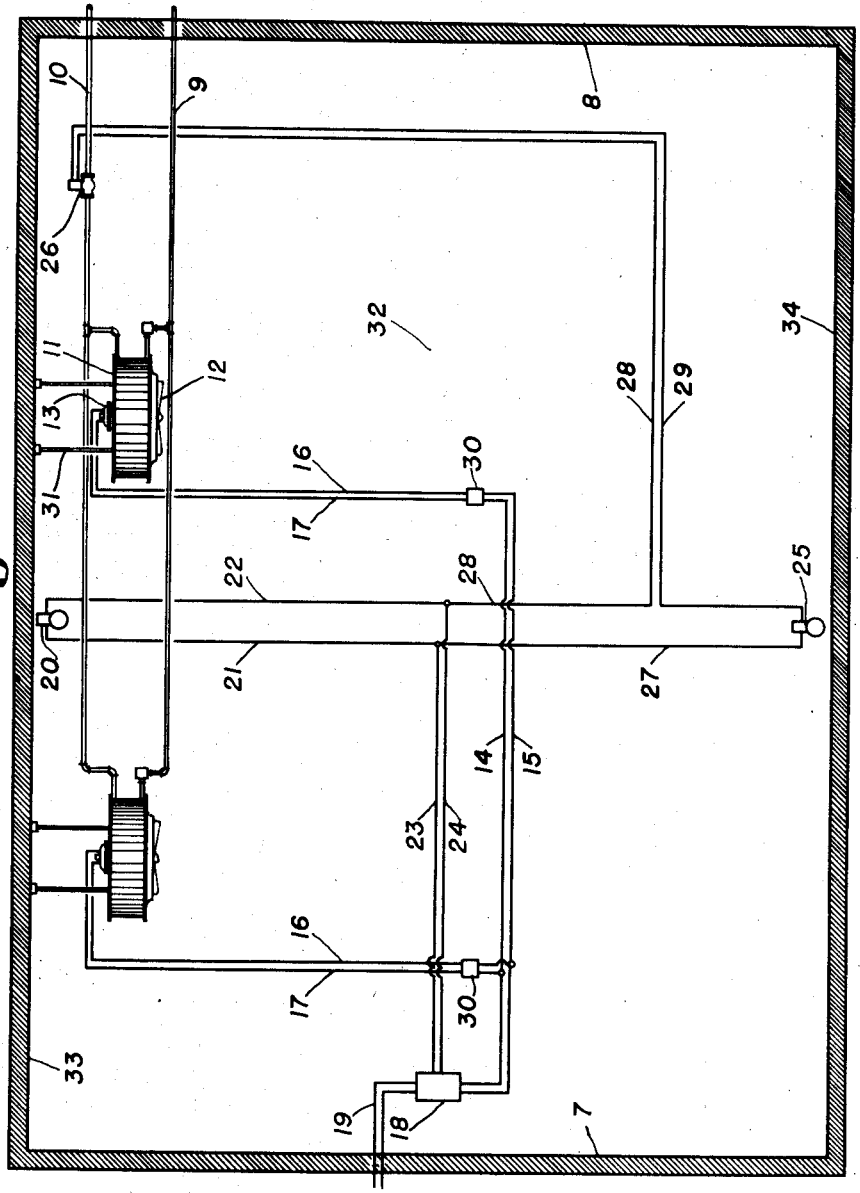

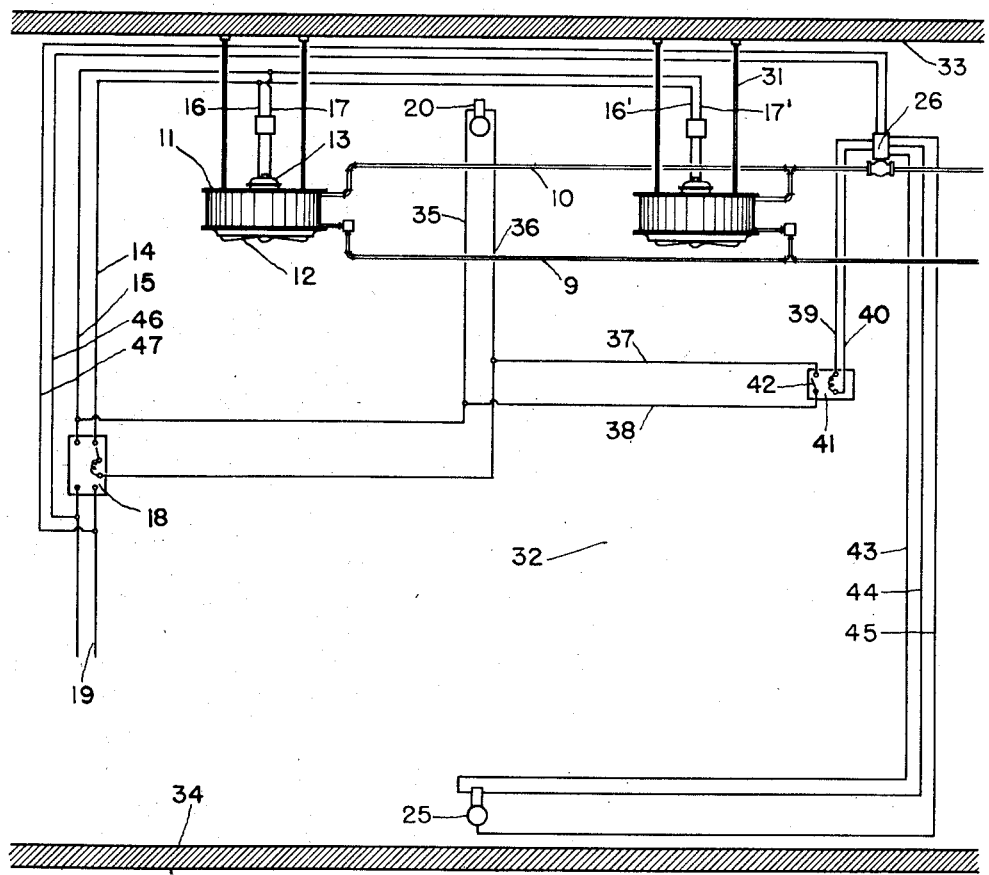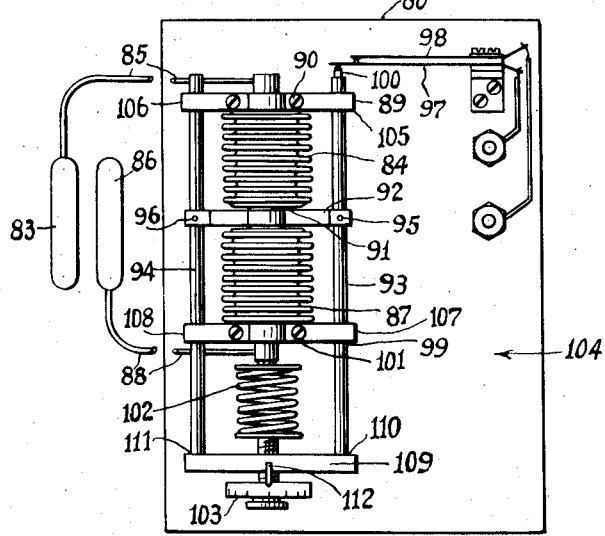

Patented Apr. 18, 1939

2,155,371

UNITED STATES PATENT OFFICE 2,155,371

HEATING SYSTEM

Ruben H. Anderegg and Robert G. Miner, La Crosse, Wis., assignors to The Trane Company, La Crosse, Wis.

Application September 11, 1937, Serial No. 163,419

11 Claims. (Cl. 237—2)

The invention relates to a heating system and control therefor.

One of the objects of the invention is to utilize the stratified hot air at the ceiling for heating purposes.

Another object of the invention is to lower the differential between the temperature of the lower and upper portions of a room which is being heated.

Another object of the invention is to maintain a predetermined differential between the upper and lower portions of the room to be heated.

Another object of the invention is to maintain a more even temperature at the breathing zone.

Another object of the invention is to propel air from the ceiling toward the floor and to regulate this according to a differential in temperature between the floor and ceiling.

Another object of the invention is to automatically change this differential with respect to the outside temperature.

Another object of the invention is to provide for the maintenance of predetermined differential between the floor and ceiling with a varying floor temperature.

The foregoing and many other specific features of the invention are set forth in the following specification, where I describe what I consider the preferred embodiments of the invention. These are illustrated in the accompanying drawings where—

Figure 1 shows a diagrammatic plan of the system.

Figure 2 shows a similar diagrammatic plan of the system with a motorized modulating valve.

Figure 5 shows a plan view of a differential thermostat, which is a modification of Figure 3.

Figure 3:
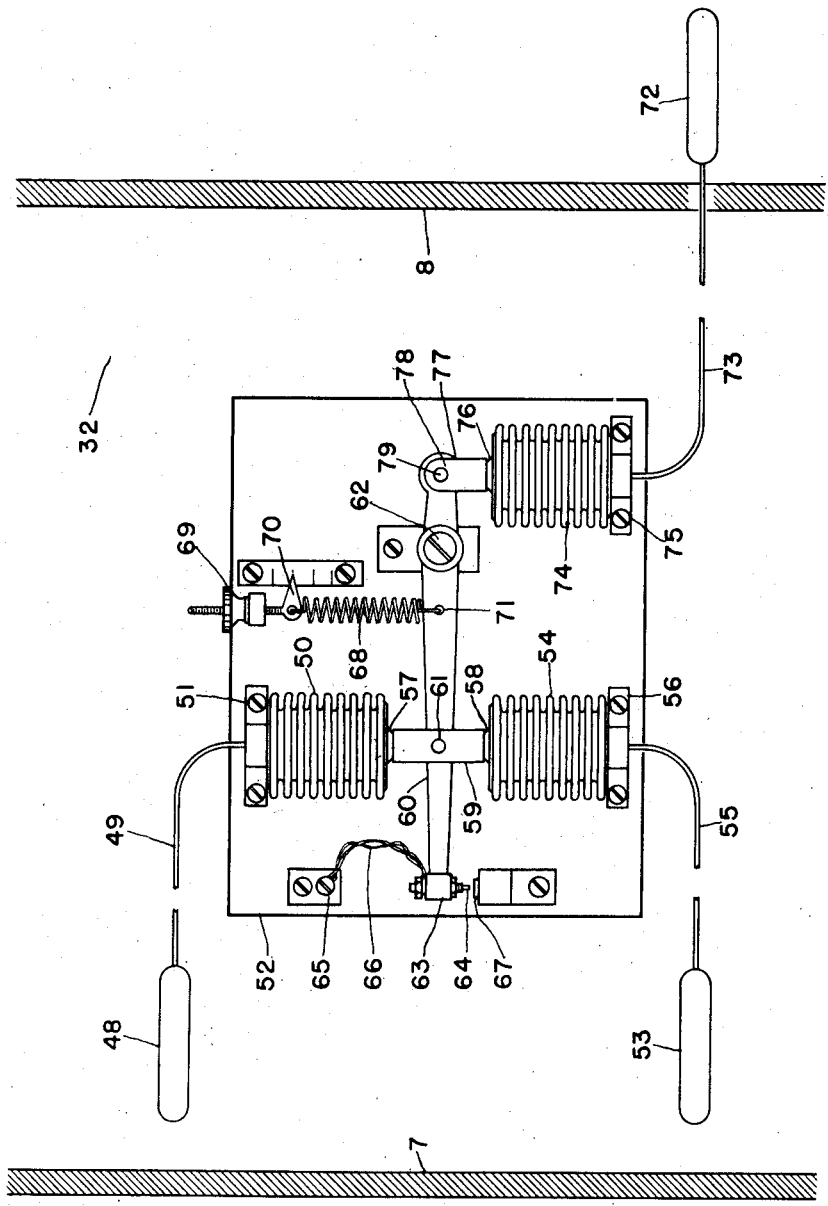
Figure 3 shows a plan view of the differential thermostat.

Referring to Figure 1, 10 represents a steam supply to circular unit heaters 11, which have a fan 12, operated by motor 13 which is operated by electric current from a source of power through the lines 14 and 15. Each fan is connected to the lines 14 and 15 by lead lines 16 and 17.

The power in the lines 14 and 15 is controlled by the magnetic switch 18, interposed between the lines 14 and 15 and the source of power 19.

The magnetic switch is connected to a ceiling thermostat 20 by an electric circuit comprising lines 21, 22, 23 and 24. The thermostat 20 is a commercial thermostat responsive to the temperature of the air surrounding it and designed to close the circuit comprising lines 21, 22, 23 and 24, when the temperature of the air rises above a predetermined point and to open the said circuit when the temperature of the air falls below said point.

The magnetic switch is also connected with a similar thermostat 25 located at or near the floor level of the room by an electric circuit comprising lines 23, 27, 24, 28 and 29, and the thermostat is so designed that when the temperature of the air surrounding thermostat 25 falls below a predetermined degree, the current will be closed; and when the said temperature rises above said point, the circuit will open.

The room 32 to be heated comprises the floor 34, the ceiling 33, and side walls 6 and 7.

A steam valve 26 controls the supply of heating fluid through the steam supply 10.

The steam valve is actuated and controlled by the electric circuit comprising lines 23, 24, 27, 28 and 29 so that when the thermostat 25 is open, the valve will be closed; and when the thermostat 25 is closed, the valve will be open and steam will be supplied to the units 11.

Thus, when the floor thermostat 25 calls for heat, the steam valve will open and the fans of the several unit heaters will be set in motion. As soon as the thermostat 25 is satisfied, the steam supply will be shut off and the fans would also stop, provided the air surrounding the ceiling thermostat was below the pre-determined point. However, if this ceiling air was above the predetermined point, the fans would remain in operation, driving the heated ceiling air toward the floor until such time as the temperature of the ceiling air fell below said predetermined point. It will be thus observed that this cycle tends to determine a differential between the floor and ceiling temperatures, the differential being determined by the predetermined settings of the ceiling and floor thermostats.

The cycle also tends to prevent overheating, in that the floor thermostat is more quickly satisfied by the downward flow of warm air. There is always a certain amount of lag between the time the floor thermostat 25 calls for heat and the time when steam reaches the unit, and the heat therein transferred to the air. During that lag the floor temperature would tend to lower quite rapidly, which the downward flow of warm air tends to counteract. The constant propulsion of the warm ceiling air downward until the temperature of that ceiling air falls below a predetermined point is valuable in maintaining an even floor temperature and also in tending to reduce the differential between the floor and ceiling temperatures to a predetermined difference.

The operation of the fan without steam, provided the ceiling temperatures are high enough, tends to prolong the period during which no steam is required, resulting in considerable fuel saving.

Experiments show that in many rooms with fifteen to eighteen foot ceilings there is as much as a 40° differential between the floor and ceiling and that frequently the ceiling temperatures are as high as 110°.

The first step in the application of this system is to determine the desired floor or lower room temperature and set the floor thermostat at that point; next determine the desired differential between the position of the floor thermostat and the ceiling.

If a differential of 15° is desired, then set the ceiling thermostat 15° higher than the floor thermostat.

It will be observed that the operation of the fans will continue until the excess ceiling heat is forced to the floor—that is, until the desired differential is established.

Referring to Figure 2, a variation of the method invented is shown. The steam valve 26 is of the modulating or motorized type. The upper thermostat 20 controls the operation of the fans in the same manner as shown in Figure 1, through the electric circuit 35 and 36, the magnetic switch 18 and the circuit formed by lines 14, 15, 16 and 17.

The lower thermostat 25 is a three-pole thermostat connected to the valve 26 by three wires, 43, 44 and 45 so that a movement of the thermostat will cause a partial movement of the valve. Both the thermostat and the valve are articles which may be commercially purchased. As long as any of the circuits connecting the valve 26 and the thermostat 25 are closed, the circuit formed by lines 39 and 40 will also be closed, inasmuch as current will only flow through the valve 26 when it is open which will close the switch 42 by means of the relay 41. This closes the circuit formed by the lines 37, 35, 38 and 36, which will also cause the fans to operate. The power necessary to operate the motorized valve 26 is supplied through the lines 46 and 47.

Another variation of this invention is shown in Figure 3, in which 48 is a bulb located in the upper portion of the room to be heated. Within this bulb is an expansible liquid and vapor, a tube 49 operatively connects this bulb to the interior of a bellows 50 fixed at one end by screws 51 to a panel board 52. A similar bulb 53 similarly filled is located in the lower portion of the room and is operatively connected to the interior of a bellows 54 by the tube 55. The bellows 54 is attached at its lower end to the panel board 52 by screws 56. The bellows 50 and 54 face each other and their proximate ends 57 and 58 are free to move on the axial line of the bellows. These free ends are connected by a yoke 59 which is pivoted to a lever 60 at 61. The lever 60 is fulcrumed at 62 and its free end 63 has mounted thereon an electric contact 64 which is insulated from the lever and which is also connected to an electrical terminal 65 by a flexible conductor 66. The other electrical terminal 67 is fixed so that the movement of the end 63 of the lever against the terminal 67 may be used to complete an electric circuit.

A tension spring 68 provided with an adjustment 69 and an indicator 70 is connected to the lever 60 at 71. The adjustment 69 is secured to the panel board 52 and comprises a threaded bolt passing through a threaded stud, whereby the spring may be shortened or elongated.

A third bulb 72 containing an expansible fluid and vapor is located in the outside air and is operatively connected by the tube 73 with the interior of a bellows 74, one end of which is affixed to the panel board 52 by screws 75. To the free end of the bellows is connected an arm 77 which is pivotally attached to the end of the lever 60 at 78 by the pivot pin 79.

Figure 4:
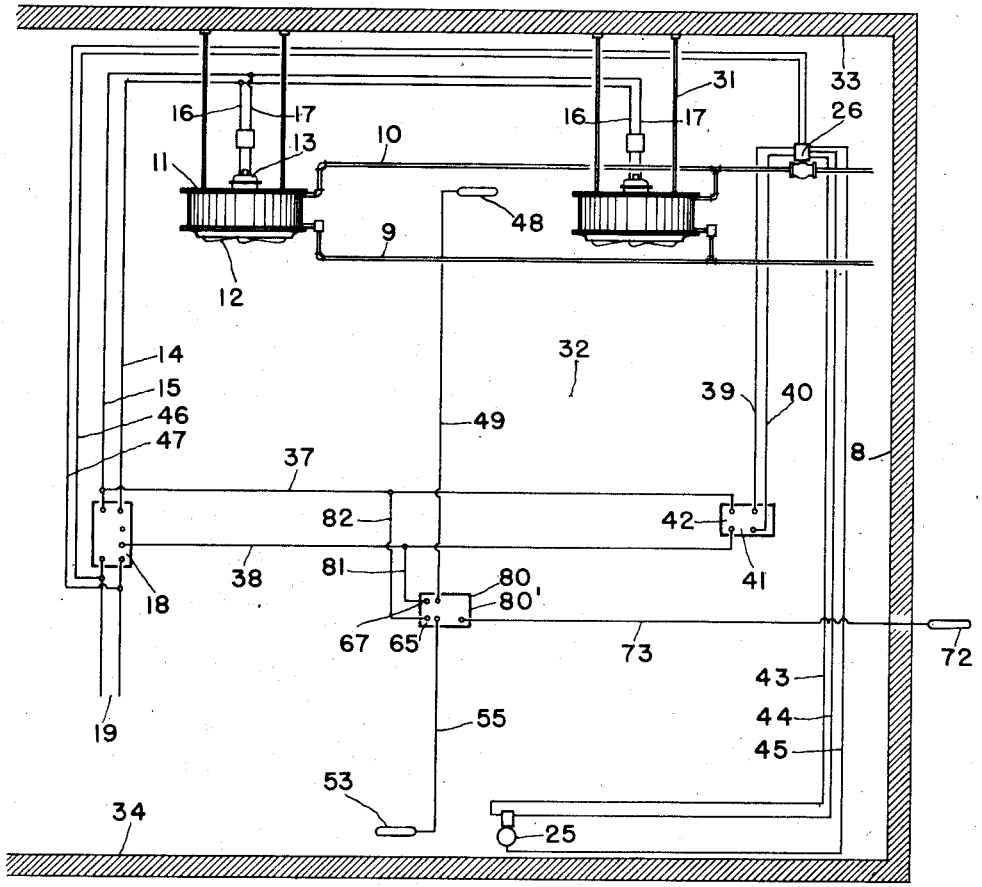
Figure 4 shows the system including the differential thermostats shown in Figures 3 and 5.

The wiring diagram connecting the differential thermostat shown in Figure 3 with the heating equipment is shown in Figure 4, wherein the differential thermostat is designated by 80 and is connected to the bulb 72 by the tube 73, to the bulb 48 by the tube 49, and to the bulb 53 by the tube 55. The terminals 65 and 67 are connected to the lines 81 and 82, forming a circuit closing the magnetic switch 18 and causing the fans to operate as heretofore shown. The lower thermostat 25 operates the fans and motorized modulating valve as shown in Figure 2.

In operation the mechanical force exerted by the free ends 57 and 58 of the bellows is proportional to the temperature of the air surrounding the respective bulbs 48 and 53. Any excess of force exerted by the free end 57 over the free end 58 will move the lever arm 60 and close the contacts. Inasmuch as the temperature of the air surrounding the ceiling thermostat is normally greater than the temperature of the air surrounding the lower thermostat, the pressure within the bellows 50 will be greater than the pressure within the bellows 54, and the resultant movement of the lever arm 60 will close the contact points 64 and 67. Thus, whenever the temperature of the air surrounding bulb 48 is greater than the temperature of the air surrounding the bulb 53, the contact points will be closed. Suppose, however, it is desired to close the contact points when there is a differential in temperature between the bulbs 48 and 53 of 15°. The mechanical force measured in gauge pressure of the bellows 54 is known at some predetermined temperature of the air surrounding the bulb 53 and the similar gauge pressure of the bellows 50 is known when the temperature of the air surrounding bulb 48 is 15° greater. The spring 68 is adjusted to exert upon the lever 60 a force equivalent to the difference in forces exerted by the bellows 54 and 50 and opposed to the force exerted by the bellows 50. As shown heretofore, the closing of the contact points 64 and 67 will close a circuit and cause the fans in the heaters to operate. Whenever the temperature of the air surrounding the bulb 48 is more than 15° greater than the temperature of the air surrounding the bulb 53, the movement of the lever 60 will close the contact points 64 and 67 and continue the operation of the fans.

The difference in temperature between the upper and lower thermostats is called the differential.

Whenever it is desired to change this differential regulating the operation of the fans, this may be done by increasing or decreasing the spring pressure exerted by the spring 68, by moving the adjustment 69.

However, the differential to be desired may vary according to the outside weather. When the outside temperature approaches the temperature of the lower thermostat, the desired differential tends to approach zero. It is thus apparent that the outside temperature has some influence on the desired and practical differential to be maintained. There has been, therefore, devised a method of regulating or varying the predetermined differential responsive to the outside temperature. By means of the vapor pressure exerted in the bellows 74 the force exerted by the bellows 74 is responsive to the temperature of the outside air surrounding the bulb 72. This force exerted by bellows 74 and bellows 50 tends to move the lever 60 in the same direction. Inasmuch as the range of outside temperature is larger than the range of differential temperature either desired or practical, the differential is not varied directly with the change in outside temperature but rather in some predetermined ratio which is regulated by the distance of the pivot 78 from the fulcrum 62.

Thus, starting with a predetermined desired differential of 15° between floor and ceiling, this differential may be further modified by a change in the outside temperature.

If it is desired to control the operation of the fans whenever the differential in temperature between the floor and ceiling exceeds a predetermined amount and not to automatically vary that differential with reference to outside temperature, this may be done by rendering the bulb 72 inoperative by draining it, whereupon the structure would operate the same as the structure shown in Figure 5.

Another modification of the invention is shown in Figure 5 wherein the bulb 83 is placed in the lower portion of the room. Bulb 83 is operatively connected with the interior of the bellows 84 by the conduit 85 while the bulb 86 placed in the upper portion of the room is operatively connected with the interior of the bellows 87 by the conduit 88. The bulbs, conduits and bellows are filled with a thermally responsive liquid and vapor therefrom so that the mechanical force exerted by the respective bellows is proportional to the temperature of the air surrounding the respective bulbs.

The bellows 84 is fixedly attached at one end to the bracket 89 by the screws 90, and the bracket 89 is welded to the base 104 at points 105 and 106. The other end 91 of the bellows 84 is free to move and is joined to a yoke 92 rigidly attached to the slide rods 93 and 94 at 95 and 96, which freely move through eyes (not shown) in the brackets 89 and 99.

The spring contacts 97 and 98 are so constructed that the movement of the end 100 of the rod 93 in one direction will tend to move the contact 97 towards contact 98, so that upon contact an electrical current may be completed. The bellows 87 is attached to the bracket 99 by the screws 101, and the bracket 99 is welded to the base 104 at points 107 and 108.

The slide rods 93 and 94 are rigidly attached to the bracket 109 at 110 and 111. The bracket 109 is not attached to the base 104 but is free to move with the slide rods 93 and 94. The tension spring 102 is positioned so that one end thereof bears against the stationary bracket 99 and the other end bears against the movable bracket 109 through the threaded screw or nut 103 in such manner that the force of the spring tends to oppose the force exerted by the bellows 87 and performs the same function as spring 68 in Figure 4. A threaded adjusting screw 103 is threaded through the movable bracket 109 at 112.

The mechanical forces exerted by the bellows 84 and 87 oppose each other and the operation is similar to that shown in Figure 3. This thermostat is designated 80' and may be substituted for thermostat 80 in Figure 4.

Suppose that a predetermined temperature of 15° is desired in a room between the floor and ceiling and it is desired to maintain that differential regardless of the temperature of the air in the lower portion of the room—that is, during the day the temperature at the lower bulb would be 70 as regulated by the thermostat 25 and the temperature at the upper thermostat would be 85. However, at night it is desirable to reduce the lower temperature to 55 and correspondingly desirable to maintain a differential of 15°, or an upper room temperature of 70°. This is done by adjusting the lower room thermostat 25 to 55° and the pre-determined differential of 15° is maintained by the differential thermostat 81' without further adjustment.

It is obvious that by the above system the predetermined differential in temperature between the upper and lower portions of the room will regulate the operation of the fans of the units driving heated air downward, which will indirectly regulate the operation of the steam valve by making the intervals between the demand for heat of greater duration.

While I have described the foregoing preferred embodiments of my invention, I contemplate that many changes may be made without departing from the scope or spirit of my invention.

I claim:

1. In a heating system, the combination of a room to be heated, a plurality of heat exchangers positioned in the upper portion of said room, fans forcing air there-through in a downward direction, a heat supply pipe to said exchangers with a regulating valve in said pipe, thermostatic means located in the lower portion of the room to cause operation of the fans and said regulating valve when a predetermined low temperature is reached, and thermostatic means located in the upper portion of the room responsive to a predetermined high temperature for regulating the operation of the fans, whereby a desired differential in temperature may be maintained between the upper and lower portions of such room.

2. In a heating system, the combination of a room to be heated, a plurality of heat exchangers positioned in the upper portion of said room, fans forcing air there-through in a downward direction, a heat supply pipe to said exchangers with a regulating valve in said pipe, thermostatic means located in the lower portion of the room to cause the operation of the fans and said regulating valve under the influence of a temperature lower than desired, and means responsive to variations in the selected differential in temperature between the upper and lower portions of said room due to increase in temperature in the upper portion thereof to regulate the operation of said fans, whereby the selected differential in temperature will be reestablished.

3. In a heating system, the combination of a room to be heated, a plurality of heat exchangers positioned in the upper portion of said room, fans forcing air there-through in a downward direction, a heat supply pipe to said exchangers, means to regulate the supply of heat, and means responsive to variations in a selected differential in temperature between the upper and lower portion of said room to cause the operation of said fans, to reestablish the selected differential in temperature when the lower part of the room is below a predetermined temperature and when the upper part of the room is above a predetermined temperature.

4. In a heating system, the combination of a room to be heated, a plurality of heat exchangers positioned in the upper portion of said room, fans forcing air there-through in a downward direction, a heat supply pipe to said exchangers with a regulating valve in said pipe, two thermostats located respectively in the lower and the upper portions of the room, and means to operate the fans whenever the lower thermostat is below a predetermined temperature and whenever the upper thermostat is above a predetermined temperature.

5. In a heating system, the combination of a room to be heated, a plurality of heat exchangers positioned in the upper portion of said room, fans forcing air there-through in a downward direction, a heat supply pipe to said exchangers, means to operate the fans until a predetermined difference in temperature between the upper and lower portions of the room is reached.

6. In a heating system, the combination of a room to be heated, a plurality of heat exchangers positioned in the upper portion of said room, fans forcing air there-through in a downward direction, a heat supply pipe to said exchangers, means to cause the operation of the fans responsive to a predetermined high temperature in the upper portion of said room and a predetermined low temperature in the lower portion thereof, whereby a desired differential in temperature between such portions of the room will be established.

7. In a heating system, the combination of a room to be heated, a plurality of heat exchangers positioned in the upper portion of said room, fans forcing air there-through in a downward direction, a heat supply pipe to said exchangers with a motorized modulating regulating valve in said pipe, two thermostats located respectively in the lower and the upper portions of the room, means to operate the fans and progressively shut off the supply of heat until the lower thermostat rises to a predetermined temperature, and means to operate the fans whenever the upper thermostat is above a predetermined temperature.

8. In a heating system, the combination of a room to be heated, a heat exchanger, a supply of heat to said heat exchanger to heat the air therein, a fan to force the heated air downward, means to cause the operation of said fan in response to variation in a predetermined differential in temperature between the upper and lower portions of said room so as to cause said fan to circulate air, and means to vary said predetermined differential responsive to the outside temperature.

9. In a heating system, thermostatic control means for maintaining a temperature differential between the ceiling and floor of a space to be heated and for varying such differential according to outdoors temperature, said means comprising, in combination with a heating and air circulating system, a pair of fluid pressure bellows which are, respectively, responsive to temperature of air adjacent the ceiling and floor of such space and which are mounted to exert their forces in opposition to each other, lever means actuated by said bellows upon movement in either direction to open or close an electrical controlling circuit, a spring acting upon one of said bellows, means for adjusting the force of said spring to vary the pressure differential between said opposed bellows and therefore to control heating to a predetermined temperature differential between ceiling and floor, and a third fluid pressure bellows responsive to outdoors temperature, actuating said lever means for automatically varying the temperature differential within the heated space according to changes in outdoors temperature.

10. In a heating system, a pair of fluid pressure thermostats responsive to temperature adjacent the ceiling and floor of a space to be heated for controlling a heater and blower and maintaining a selected differential between the ceiling and floor temperature, said thermostats including a pair of bellows mounted in opposition, a pivoted contact arm moved by said bellows to open and close an electric control circuit upon changes in temperature which actuate the bellows by fluctuations of fluid pressure within them, an adjustable spring for loading one said bellows thereby to vary the pressure differential at which it will overcome the other and consequently, the temperature differential within the heated space, and a third bellows responsive to outdoors temperature, mounted to engage said pivoted arm and move it in predetermined ratio to changes in outdoors temperature, thereby automatically varying the loading force of said spring and effecting changes in temperature differential within the heated space as required by changes in outdoors temperature.

11. In a heating system, the combination of a room to be heated, a heat exchanger, a heat supply therefor, a fan to force heated air from the exchanger into the lower portion of the room, thermostatic means for controlling said fan located in the upper and lower portions of said room and being responsive to predetermined maximum and minimum temperatures respectively, and means to regulate the heat supply according to the demands of the control means in the lower portion of the room, whereby if the differential in temperature as determined by the settings of said control means is exceeded by a rise in temperature in the upper portion of the room the said fan will operate, and if exceeded by a drop in temperature in the lower portion of the room the said fan will operate and additional heat will also be supplied to the exchanger to reduce the differential in temperature between the upper and lower portions of the room to the predetermined value.

RUBEN H. ANDEREGG.
ROBERT G. MINER.